Feb. 8, 1944.   A. B. CRAWFORD   2,341,265
HOPPER FEED DEVICE
Filed Jan. 6, 1943
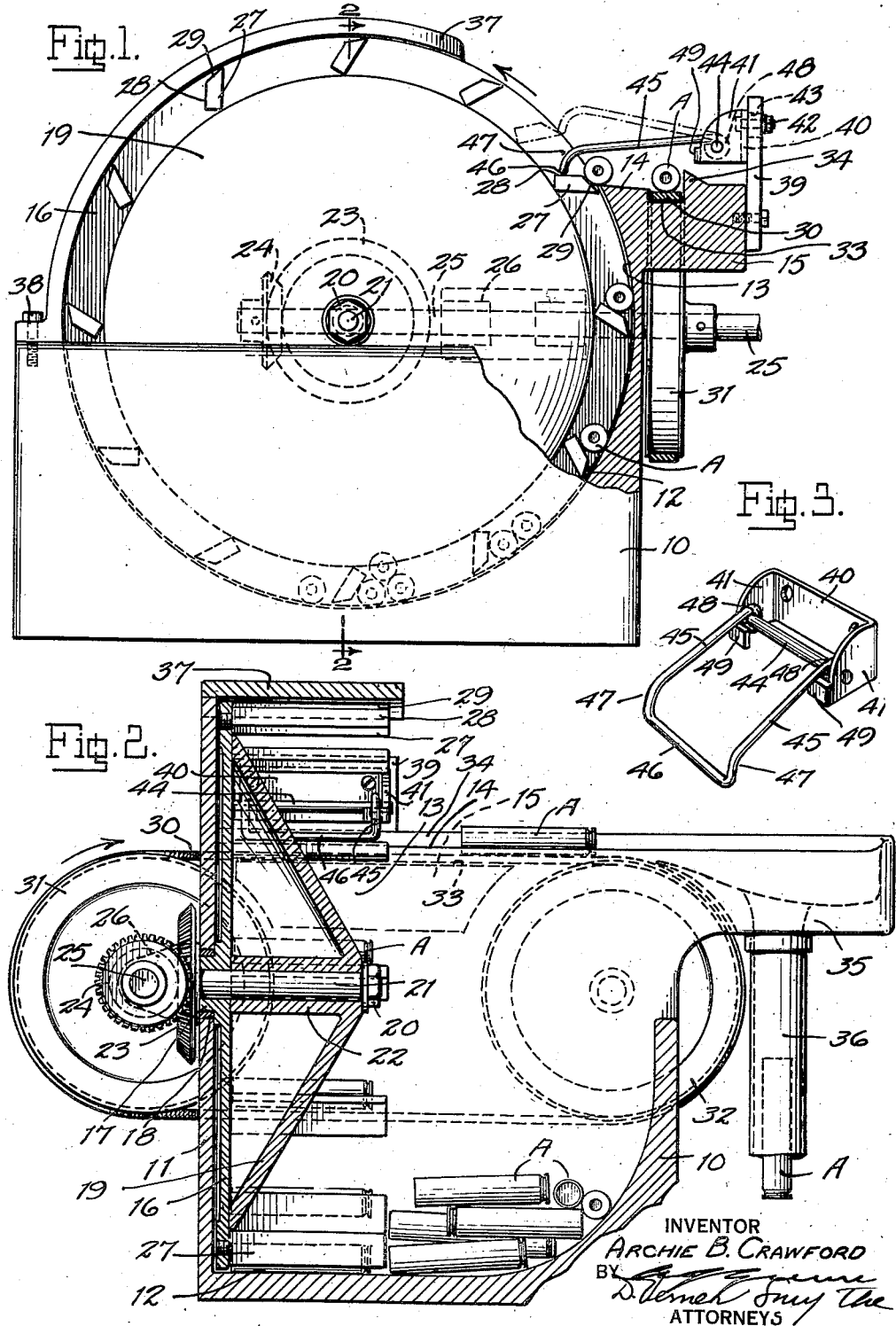
INVENTOR
ARCHIE B. CRAWFORD
BY
ATTORNEYS Patented Feb. 8, 1944

2,341,265

UNITED STATES PATENT OFFICE 2,341,265

HOPPER FEED DEVICE

Archie B. Crawford, Independence, Mo., assignor to Remington Arms Company, Inc., Bridgeport, Conn., a corporation of Delaware Application January 6, 1943, Serial No. 471,403

3 Claims. (Cl. 198—20)

The present invention relates to a hopper feed mechanism, particularly of the paddle type wherein a series of paddles provided upon a rotatable paddle wheel convey articles from a hopper to a feed belt or the like for carrying them to a feed tube or the like, which in turn feeds them to a machine for performing a production operation upon the articles, and the invention is particularly concerned with a paddle wiper means arranged to engage the paddles in relation to the point at which the paddles transfer the articles from the hopper to the feed belt so as to positively insure transfer of the articles, preventing them from being carried beyond the transfer point.

While the invention is capable of use in connection with the feeding from a hopper of any suitable type of article, the present disclosure is directed by way of illustration to a hopper feed mechanism for the feeding of cartridge cases to a machine for performing a production operation thereon, as for instance, a press for shaping the cases from a cylindrical form to a tapered contracted neck form, and it is an object of the invention to provide positive feed means whereby each paddle transfers a cartridge case to the feed belt in time with the operation of the press, thus preventing loss of production due to feed lags, and further to provide feed means which will prevent damage to the machine and the consequent production delay caused by the jamming of articles carried by the paddles beyond the transfer point. In the particular operation upon the cartridge cases contemplated in the present illustrative disclosure, the cases are lubricated with lard oil before being placed in the hopper, preparatory to the draw press operation thereon, and this causes all parts of the hopper and the paddle wheel coming in contact with the cases to become heavily coated with the lard oil. As this coating becomes dirty or congeals through cooling, it is sufficiently sticky to cause the cases to adhere to the paddles of the revolving paddle wheel and be carried thereby beyond the transfer point. There is a consequent loss in machine efficiency as well as the possibility of damage to the machine. In some cases, the case carried beyond the transfer point will drop back into the hopper with only a production delay due to gaps in the feed line preventing an ample supply of cases reaching the press in timed relation with its operating speed. In other cases, the damage is apt to be considerable and costly, because the cases sticking to the paddles come into contact with the guard surrounding the paddle wheel, where they will jam and cause the wheel to be held, and resulting either in breakage of the guard and paddles or burned out drive motors and blown fuses.

A further object is to provide a paddle wiper device which may be attached to existing types of hopper feed machines without appreciable alteration therein, and which is relatively simple in structure and operation and free from parts which will readily get out of order or adjustment.

With the above and other objects in view, an embodiment of the invention is shown in the accompanying drawing, and this embodiment will be hereinafter more fully described with reference thereto, and the invention will be finally pointed out in the claims.

In the drawing:

Fig. 1 is a front elevation, partially broken away and partially in vertical section, of the hopper feed machine provided with a wiper device according to the illustrated exemplary embodiment of the invention, showing in full lines an initial engaging position of the wiper device with one of the paddles, and showing in dot-and-dash lines the moved position thereof at a further point in the rotary feed of the paddle.

Fig. 2 is a vertical sectional view, taken along the line 2—2 of Fig. 1.

Fig. 3 is a perspective view of the wiper device, shown disengaged from the machine.

Similar reference characters indicate corresponding parts throughout the several figures of the drawing.

Referring to the drawing, the paddle feed hopper mechanism in which the invention is incorporated comprises an article receiving hopper structure 10, shown in the illustrated embodiment of the invention as designed to receive cartridge cases A at one stage in their production, for the purpose of feeding them with their head ends forward through a suitable feed tube to a machine for performing a further operation thereon, and wherein preparatory to this further operation the cartridge cases are coated with a lubricant, such as lard oil. All surfaces of the hopper feed mechanism coming into contact with the cases become heavily coated with this lard oil. The hopper structure is provided with a vertically disposed rearward wall 11, of generally circular form, and forwardly adjacent this circular wall its surface is cylindrically formed, as at 12, to provide a cooperating surface for the paddles of the paddle wheel, as will presently more fully appear, this cylindrical surface at the rising side of the paddle wheel extending for a substantial distance above the horizontal diametric plane of the paddle wheel, as at 13, and terminating in an outwardly and downwardly inclined ledge 14 provided upon the upper side of a lateral extension portion 15 of the hopper, this ledge being disposed at the transfer point at which the cartridge cases are transferred by the paddle wheel to the feed belt, as will more fully appear.

The paddle wheel 16 is rotatably mounted at its hub portion 17 in a bearing 18 in the hopper wall 11, and is preferably provided upon its forward side with a conical plate 19 secured thereto by a nut 20 upon the forward end of the drive shaft 21, extending through the hub 17 of the paddle wheel and the hub 22 of the plate 19, and upon the other end of which shaft is provided a bevel gear 23 engaged and driven by a bevel pinion 24, mounted upon the end of a horizontal drive shaft 25 journaled in a bearing bracket 26 secured upon the rearward side of the hopper wall 11.

The peripheral edge of the conical plate 19 is spaced inwardly from the peripheral edge of the paddle wheel 16, and upon the projecting marginal portion of the paddle wheel there are mounted the spaced paddle members 27. These paddle members project in parallel relation to the axis of the paddle wheel and have a cross-sectional shape providing a flat forward surface 28 and a beveled outer surface 29 extending at an obtuse angle from the forward surface 28 into close proximity to the cylindrical hopper surface, the paddles being set so that the flat forward surface 28 is tangential to a predetermined circumferential line about the axis of the paddle wheel, whereby as the paddles reach the transfer point contiguous to the ledge surface 14 the forward surface 28 is approximately horizontal, being downwardly tilted toward the hopper surface 13, as the paddle moves upwardly to the transfer point and downwardly tilted inwardly as it moves upwardly beyond the transfer point. The cylindrical cartridge cases are successively carried upwardly by the paddles along the cylindrical hopper surface 13, each moving outwardly along the flat surface 28 of the moving paddle as the paddle moves upwardly, so that at the transfer point the cases reach the point edge between the flat forward surface 28 and the inclined outer surface 29 approximately at the point just before the forward surface 28 assumes a horizontal position. Consequently, as the cartridge case passes the edge of the ledge 14 it overbalances upon the inclined outer surface 29 of the paddle and rolls downwardly thereon to the ledge 14. At this point, the cases roll from the inclined ledge directly upon a feed belt 30 carried upon a pulley wheel 31 mounted upon the drive shaft 25 and a pulley wheel 32 mounted upon the end wall of the hopper, the upper traverse of this belt moving in a guide channel 33 provided at the lower end of the inclined ledge 14, the outer wall 34 of this channel being extended upwardly a substantial distance to provide a back stop for the cartridge cases rolling upon the belt.

The cartridge cases are carried by the belt to the feed tube entrance mouth structure 35, connected at the upper end of the feed tube 36, the latter extending to the draw press or other suitable machine for operating upon the cartridge cases. The entrance mouth structure 35 is so designed that the cartridge cases will all feed with their head ends forward. The center of gravity and balance point of the cartridge case is toward the head end, due to the overbalancing weight of the heavier head end, so that a head-forward cartridge fed by the belt to the feed tube tilts downwardly into the feed tube mouth about its inner corner, whereas an open-end-forward cartridge will slide across the mouth to the point where its balance point comes into relation with the outer corner of the mouth, whereupon the head end tilts downwardly into the feed tube. In this connection it is pointed out that the paddle feed hopper is such that the majority of the cartridge cases tend to engage the paddles with their head ends forwardly.

A circumferential protective guard member 37 is secured upon the hopper by bolts 38, and extends in surrounding relation to the paddles, the end of this guard being spaced upwardly from the ledge 14 at the transfer point.

Heretofore, the sticky condition of the paddles due to the coating of lard oil lubricant thereon would frequently cause the cartridge cases to stick to the paddles beyond the transfer point, and as the paddles moved from their horizontal position to an inwardly tilted position the cartridge cases would not feed on to the ledge 14 but would tend to roll back into the hopper, thus resulting in a gap in the succession of cartridges being fed to the belt, which in turn would interrupt the flow of the cartridge cases to the draw press or other machine operating upon them. In the course of a production day, these feed gaps may cause a loss of efficiency in the machine of as much as 25%, with a corresponding loss in production. While some of the cartridge cases carried beyond the transfer point would tend to roll into the hopper, others would continue to adhere to the paddle and be carried into engagement with the end of the guard 37, and as the cartridge case would frequently at this point be disposed beyond the outer periphery of the paddle wheel it would jam between the paddle wheel and the guard, sometimes resulting in breakage of the paddles and guard and sometimes resulting in blown fuses and burned out motors. In any case, the damage and the delay required to repair the damage was considerable and costly.

According to the present invention, a paddle wiper device is incorporated in the machine to positively cause the transfer of the successive cartridge cases from the paddles to the belt. This wiper device is mounted upon a supporting fixture 39, secured upon the extension structure 15 of the hopper opposite the transfer point, and comprises a bracket 40 provided with forwardly projecting end walls 41—41 and secured to the fixture 39 by bolts 42 engaged through vertical slots 43 in the fixture to permit vertical adjustment of the bracket. A horizontal shaft 44 is mounted at its ends in the end walls of the bracket, and has pivotally mounted thereon a swinging wiper member, preferably formed of bent wire rod, and comprising side arm portions 45—45 and a transverse connecting forward bar portion 46, the side arms 45 being curved downwardly into hook form, as at 47, adjacent the bar portion 46, and having loop ends 48 rotatably engaged about the shaft 44. The end walls of the bracket are each provided with an inwardly projecting stop lug 49, disposed beneath the respective side arms of the wiper member for the purpose of limiting the downward swinging movement of the wiper member.

The disposition of the pivotal axis of the wiper member and the distance of its transverse bar and end 46 from the axis is such that the swinging arc of the bar end 46 intersects the circumferential outer edge of the paddle wheel at a point above the cartridge case transfer point, the bar end 46 of the wiper engaging the flat forward surface 28 of the paddles near the inner edge just before the paddles reach the transfer point and the surface 28 assumes its horizontal position, thereupon moving outwardly along the surface of the paddle with a wiping action to the point end, as indicated by the dot-and-dash lines in Fig. 1, where it is released and drops into engagement with the next rising paddle. The engagement with the paddle is such that the cartridge case is free to transfer in its normal manner from the paddle to the ledge 14, but in the event that it adheres to the paddle and moves beyond the transfer point the wiper member engages it and moves it from the paddle to the ledge 14, the engagement with the case being at a point which will positively cause the cartridge case to engage the ledge and roll to the feed belt, without the possibility of dropping back into the hopper.

By adjusting the bracket 40 vertically the point of engagement of the wiper with the paddles may be regulated, as desired. As the pivotal support of the wiper is removed from contact with the cartridge cases, it will not become coated with and its action impaired by the lard oil lubricant.

The form of the invention illustrated in the drawing and described herein is typical and illustrative only, and it is evident that the invention is capable of embodiments in other forms, all falling within the scope of the appended claims, which are to be broadly construed.

What is claimed is:

1. In combination, a rotary paddle feed hopper comprising a paddle wheel having spaced paddles movable upwardly to a transfer point, and article receiving means at said transfer point to which said articles move from the paddles, and a movably mounted wiper member including a hook shaped paddle engaging portion movable in a path intersecting the rotary path of said paddles adapted to individually engage said paddles at a point in their rising path contiguous to said transfer point and inwardly of articles carried individually on the respective paddles, and adapted through rising movement of each paddle past said transfer point to wipe outwardly across said paddle to remove said article to said receiving means, and being disengageable from said paddle as the latter continues its movement beyond the path of movement of said wiper, whereby said wiper moves downwardly into engagement with the successive paddle.

2. In combination, a rotary paddle feed hopper comprising a paddle wheel having spaced paddles movable upwardly to a transfer point, article receiving means at said transfer point to which said articles move from the paddles, and a pivotally mounted wiper member having free swinging movement in the plane of rotation of said paddles and including a paddle engaging portion movable in a path intersecting the rotary path of said paddles adapted to individually engage said paddles at a point in their rising path contiguous to said transfer point and inwardly of articles carried individually on the respective paddles, and adapted through rising movement of each paddle past said transfer point to wipe outwardly across said paddle to remove said article to said receiving means, and being disengageable from said paddle as the latter continues its movement beyond the path of movement of said wiper, whereby said wiper moves downwardly into engagement with the successive paddle, an adjustable mounting for said wiper member adapted through adjustment to vary the engaging and disengaging points of said wiper member with said paddles, and movement limiting means arranged to limit the downward movement of said wiper member to a predetermined point.

3. In combination, a rotary paddle feed hopper for cartridge cases comprising a paddle wheel having spaced paddles movable upwardly to a transfer point, and cartridge case receiving means, and a pivotally mounted wiper member having free swinging movement in the plane of rotation of said paddles and including a paddle engaging portion movable in a path intersecting the rotary path of said paddles adapted to individually engage said paddles at a point in their rising path contiguous to said transfer point and inwardly of cartridge cases carried individually on the respective paddles, and adapted through rising movement of each paddle past said transfer point to wipe outwardly across said paddle to remove said cartridge case to said receiving means, and being disengageable from said paddle as the latter continues its movement beyond the path of movement of said wiper, whereby said wiper moves downwardly into engagement with the successive paddle.

ARCHIE B. CRAWFORD.